LE ROY BAKER.
PROCESS OF MAKING PIGMENTS.
APPLICATION FILED JULY 16, 1919.
1,425,436.
Patented Aug. 8, 1922.
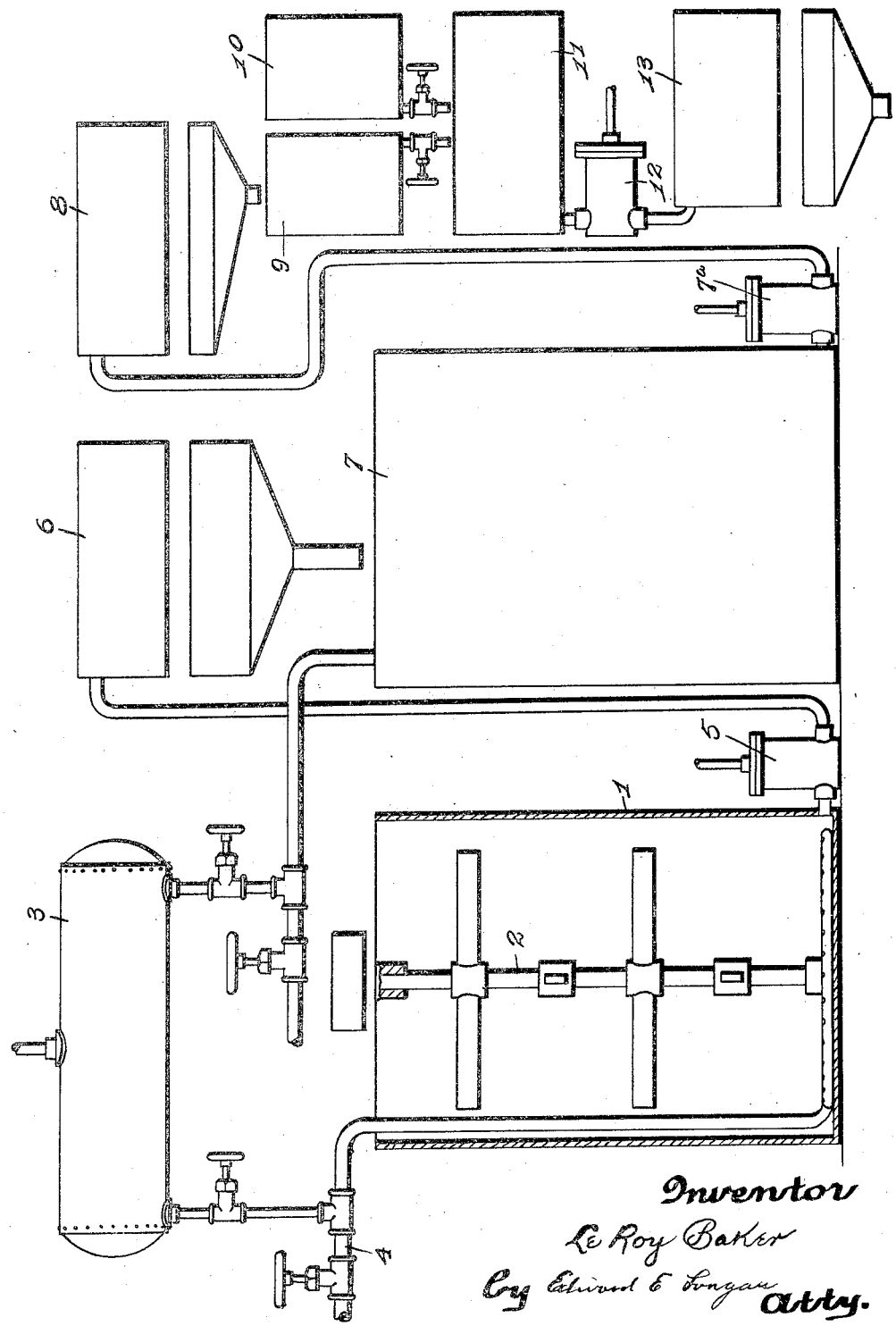

UNITED STATES PATENT OFFICE.

LE ROY BAKER, OF ST. LOUIS, MISSOURI.

PROCESS OF MAKING PIGMENTS.

1,425,436.   Specification of Letters Patent.   Patented Aug. 8, 1922.

Application filed July 16, 1919. Serial No. 311,296.

*To all whom it may concern:*

Be it known that I, LE ROY BAKER, a citizen of the United States, and resident of St. Louis and State of Missouri, have invented certain new and useful Improvements in the Processes of Making Pigments, of which the following is a specification containing a full, clear, and exact description, reference being had to accompanying drawings, forming a part thereof.

My invention relates to certain new and useful improvements in the process of making pigments and especially relates to making a sun proof zinc white pigment.

The accompanying drawing illustrates a conventional form of apparatus by means of which my process may be carried out.

In carrying out my process I place a solution of commercial or impure zinc sulphate in the tank 1 in which is located a mechanical agitator 2 and the tank 1 is connected with a source of compressed air supply 3 and with a source of steam supply through the valve controlled steam inlet pipe 4.

The zinc sulphate solution contained in tank 1 is heated with steam to or near the boiling point. After the solution has been heated by steam or by any other suitable agency, I admit air under pressure into the solution from the compressed air tank 3. By means of this bubbles of air are blown through the solution. The purpose of heating the zinc sulphate solution is to make it more active and more susceptible to the oxygen in the air bubbles.

During the time the zinc sulphate solution is being treated with steam and compressed air I add to the zinc sulphate solution a metallic peroxide (such as calcium or barium peroxide) in powdered form, in sufficient quantity to remove the iron present and I also add to the solution a monoxide (such as zinc oxide or lead oxide) in powdered form and in the proportion of about one per cent by weight of the zinc sulphate in the solution. It will be understood, of course, that I can add any other suitable metallic monoxide. After the foregoing treatment by means of a pump such as 5 I transfer the solution from the tank 1 into the filter press 6 for the purpose of removing the iron oxide which has been precipitated from the iron sulphate contained as an impurity in the zinc sulphate solution and then conduct the filter pressed solution into another tank 7 which is also connected with a steam and compressed air supply. After the solution has reached tank 7 I subject it to the same treatment that it was subjected to in tank 1 and then transfer this solution by pump $7^a$ to another filter press 8 and from this filter press the solution is transferred to tank 9 or storage tank. The zinc oxide having passed into the hydrated form passes through the filter with the liquor as a fine silky precipitate.

I then take a solution of barium sulphide contained in the tank such as 10 and allow the treated solution in tank 9 and the barium solution in tank 10 to flow into a mixing tank 11. In this tank 11 the treated sulphate solution and the barium solution are mixed together. This precipitates the sulphate solution as the two metallic salts mutually precipitate each other.

After this operation I take the solution from tank 11 and transfer it by means of a pump 12 into another filter press 13. After this the filter pressed precipitated pigment is washed, dried, calcined, quenched in cold water, ground wet, again washed and again filter pressed then dried and packed for the market.

I have discovered by experiment that in the manufacture of pigments wherein a metallic peroxide is used alone that the batch of pigment was not sunproof. I further discovered that by adding a monoxide capable of precipitating zinc oxide in hydrated form that the pigment was permanent under all light conditions.

Having fully described my invention, what I claim is:

1. The process of making pigments which consists in first taking a solution of zinc sulphate, subjecting said solution to air and steam under pressure in the presence of an insoluble metallic peroxide and an insoluble metallic monoxide; second filter pressing the resulting solution; third subjecting such solution to steam and air under pressure; fourth filter pressing the last mentioned solution; fifth mixing the last mentioned filtered solution with a solution of barium sulphide in equal molecular proportions; sixth filter pressing the last mentioned resulting solution.

2. The herein described process of making a sun-proof zinc sulphide white pigment which consists in precipitating a solution of zinc sulphate with a solution of barium sulphide in the presence of zinc oxide.

In testimony whereof, I have signed my name to this specification, in the presence of two subscribing witnesses.

LE ROY BAKER.

Witnesses:
WALTER C. STEIN.
EDWIN C. TAYLOR.